H. W. CATLIN.
Whip-Socket.
No 46,215. Patented Feb. 7, 1865.
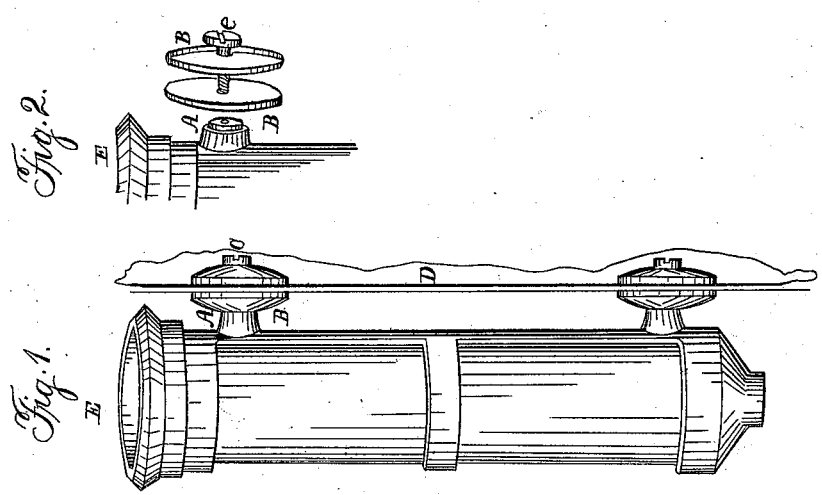

UNITED STATES PATENT OFFICE.

H. W. CATLIN, OF BURLINGTON, VERMONT.

IMPROVEMENT IN WHIP-SOCKET FASTENINGS.

Specification forming part of Letters Patent No. 46,215, dated February 7, 1865.

*To all whom it may concern:*

Be it known that I, H. W. CATLIN, of Burlington, county of Chittenden, and State of Vermont, have invented a new and useful Improvement in Whip-Socket Fastenings for Vehicles; and I do hereby declare that the following is a full, clear, and exact description of the same, which will enable others skilled in the art to make and use the same, reference being had to the accompanying drawings, making a part of this specification, in which—

Figure 1 represents a side view of the whip-socket as fastened to the dash of the vehicle. Fig. 2 represents the fastening before it is screwed up and onto the whip-socket.

Similar letters of reference indicate like parts.

This invention relates to a new and useful and improved whip-socket fastening for vehicles.

The object of the invention is to obtain a durable, cheap, and secure device for the attachment of whip-sockets to the leather or other material of which the dash may be made, at any desired place, keeping it always upright and capable of being easily attached without defacing the leather, and bringing it close to the dash.

The invention consists in the employment or use of two concave or, may be, flat washers and a screw, as hereinafter fully set forth.

A represents the part of the socket which receives the screw. B represents the washer. C represents the screw. D represents the dash. E represents the socket.

From the above description it will be seen that the screw C, passing through the washer B B into the hole stepped into the socket A, when screwed up tight, brings the washers B and B firmly together against the dash-leather D and the socket E firmly against the washer B, thus giving a bearing on the leather dash equal to the circumference of the washers B, which may be made of a diameter equal to the strength desired, and to attach the socket to the dash it is only needful to make a small hole through the leather the size of the screw and the screwing up together of the washers completely covers the hole in the leather.

I claim as new and desire to secure by Letters Patent—

The washers B, in combination with the screw C, passing through the dash D into the socket A, to be arranged substantially in the manner as and for the purpose set forth.

H. W. CATLIN.

Witnesses:
W. F. GREENLEAF,
SAMUEL MCWHIRTER.